(12) United States Patent
Janz et al.

(10) Patent No.: US 6,335,813 B1
(45) Date of Patent: Jan. 1, 2002

(54) DEVICE FOR FORMATTING BINARY OPTICAL SIGNALS

(75) Inventors: Christopher Janz, Issy-les-Moulineaux; Béatrice Dagens, Paris; Dominique Chiaroni; Bruno Lavigne, both of Antony, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/285,660

(22) Filed: Apr. 5, 1999

(30) Foreign Application Priority Data

Apr. 30, 1998 (FR) ............................................ 98 05544

(51) Int. Cl.[7] ............................................. H04B 10/04
(52) U.S. Cl. ..................... 359/181; 359/179; 359/188; 359/237; 359/238
(58) Field of Search ................................ 359/179, 181, 359/188, 237, 238

(56) References Cited

U.S. PATENT DOCUMENTS 5,781,326 A * 7/1998 Chiaroni et al. ............. 359/237
5,999,283 A * 12/1999 Roberts et al. .............. 359/108
6,229,633 B1 * 5/2001 Roberts et al. .............. 359/135

FOREIGN PATENT DOCUMENTS

EP 0 813 097 A1 12/1997

OTHER PUBLICATIONS

C. Joergensen et al, "Wavelength Conversion by Optimized Monolithic Integrated Mach–Zehnder Interferometer", IEEE Photonics Technology Letters, Apr. 1996, IEEE, USA, vol. 8, No. 4, pp. 521–253, XP000587013.

B. Mikkelsen eet al, "Polarisation insensitive wavelength conversion of 10 Gbit/s signals with SOAs in a Michelson interferometer", Electronics Letters, Feb. 3, 1994, UK, vol. 30, No. 3, pp. 260–261, XP00431304.

* cited by examiner

Primary Examiner—Leslie Pascal
Assistant Examiner—Hanh Phan
(74) Attorney, Agent, or Firm—Sughrue Mion, PLLC

(57) ABSTRACT

To format a power modulated input optical signal, at the same time as improving its power dynamic range and the extinction rate of the output signal, a device for formatting binary optical signals includes a first stage for supplying a modulating signal having stabilized high levels as a function of the input signal and an interferometer structure second stage receiving the modulating signal and a probe wave power modulated in phase opposition to the modulation of the modulating signal. The low and high levels of the probe wave are stabilized. Applications include optical transmission.

6 Claims, 2 Drawing Sheets

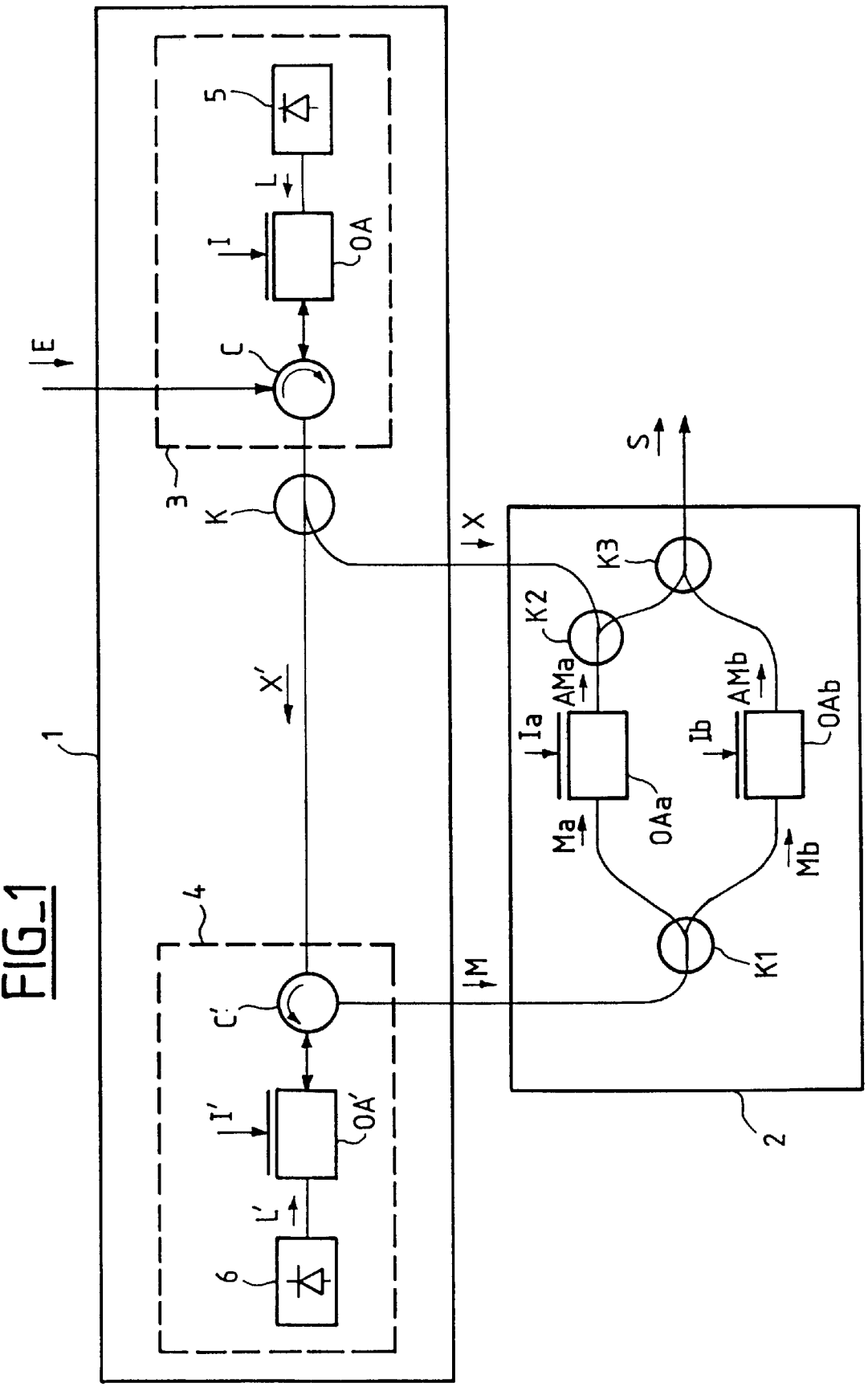
FIG_1

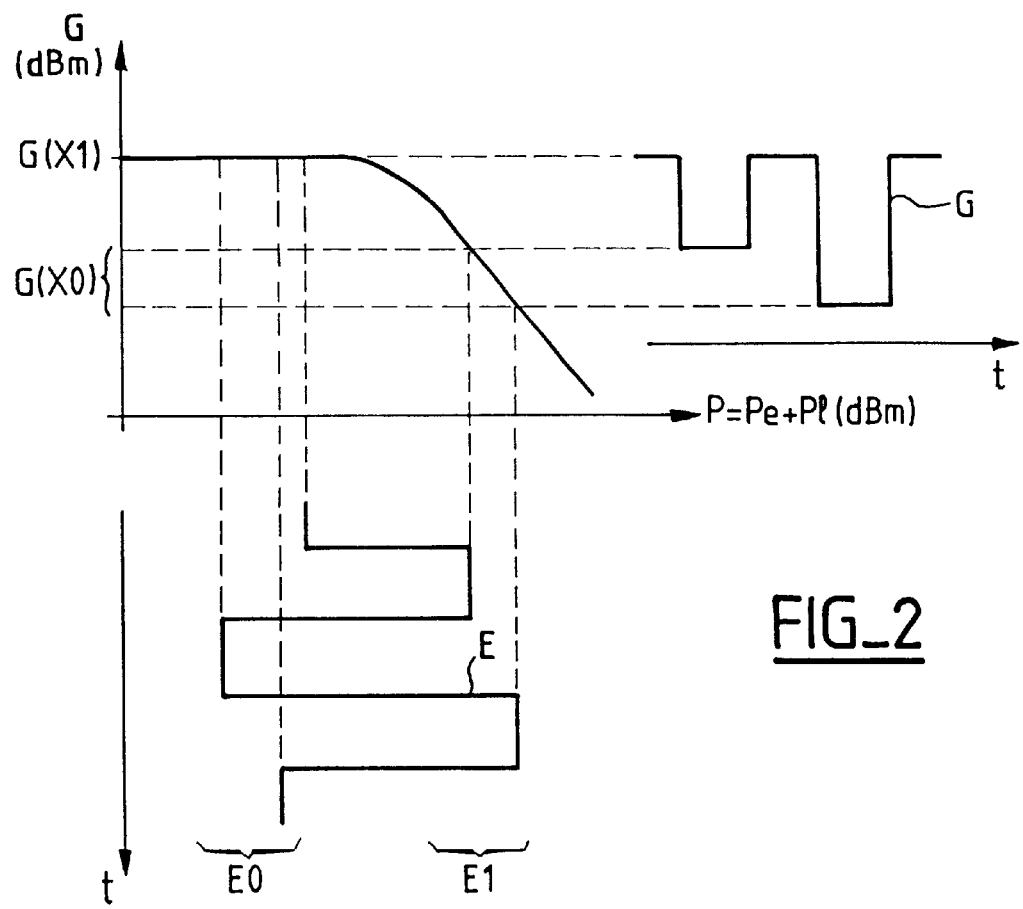
FIG_2
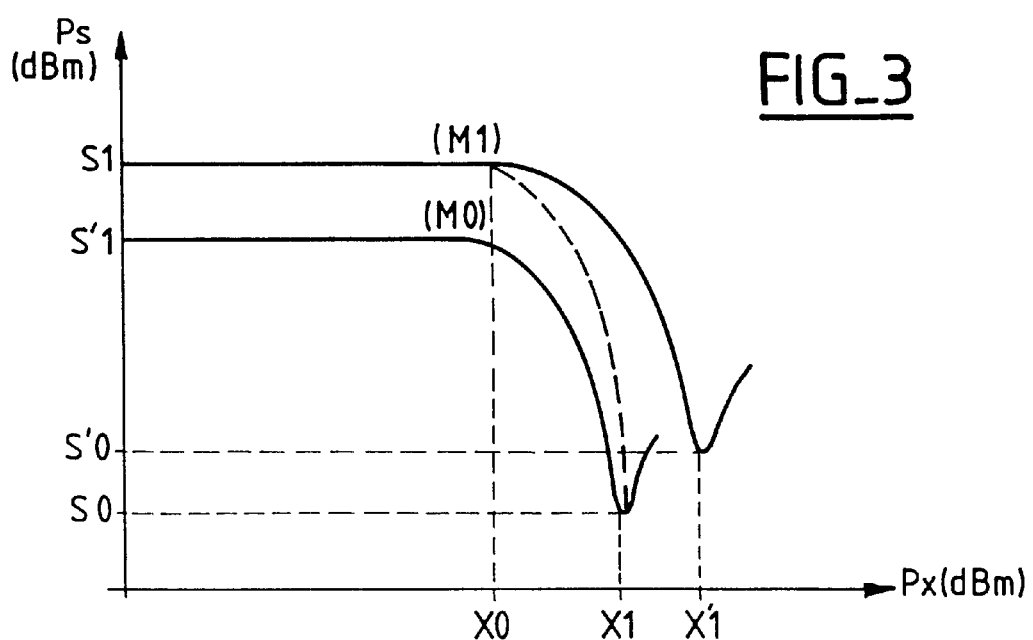
FIG_3

DEVICE FOR FORMATTING BINARY OPTICAL SIGNALS

BACKGROUND OF THE INVENTION

1. Field of the Invention

The invention concerns opto-electronic systems used to transmit or process optical digital data optically.

2. Description of the Prior Art

Information in such systems is often in the form of binary data represented by pulses modulating an optical carrier wave. The amplitude (or power) of the modulated optical wave determines a binary value.

The signal is inevitably degraded during transmission which makes it more difficult for the receiver to detect the high and low levels of the received signal. With regard to its amplitude, the quality of an optical signal is usually defined by two parameters: the signal to noise ratio and the extinction ratio. The signal to noise ratio is defined as the ratio of the optical power of the signal to the noise power in a band of wavelengths containing the wavelength of the signal carrier. The extinction rate is defined as the ratio of the powers respectively corresponding to the high and low levels of the signal.

The invention concerns an all-optical device, i.e. a device with no optical-to-electrical conversion or vice versa, which improves the quality of a binary optical signal, i.e. increases its extinction rate whilst retaining the highest possible signal to noise ratio. In other words, the device is required to be capable of starting from a poor quality modulated input signal and supplying an output signal with a very high signal to noise ratio and whose high levels are stabilized with a constant optical power and whose low levels are at a very low power.

One solution already proposed to the problem of increasing the extinction rate is to use an interferometer structure, for example one of the Mach-Zehnder type. The structure has two branches carrying two coherent waves originating from a probe wave and coupled to form the output signal. At least one branch includes a medium whose index varies as a function of the optical power that it conveys and an input signal is introduced into that branch. The power variations of the input signal then modulate the index and the two waves can interfere destructively or constructively according to the power of the input signal.

A structure of the above kind does indeed improve the extinction rate but has the drawback that the conditions for destructive and constructive interference are very constraining on the input signal, regarding in particular its wavelength and most of all its power in the high state. As a result its behavior is very sensitive to fluctuations in these parameters.

An improvement to the above device is described in European patent application EP-A-0813097 published Dec. 17, 1997. The proposed device has two stages in cascade. A first stage acts as a peak limiter supplying a modulating signal as a function of the input signal with its high levels stabilized. A second stage is of the interferometer type mentioned above and receives as its input signal the modulating signal from the first stage.

The function of the first stage is therefore to eliminate any fluctuations in the high levels of the modulating signal fed into the interferometer structure. This assures stable behavior of that structure. What is more, if the first stage is a wavelength converter using a semiconductor optical amplifier, the device is independent of the value of or fluctuations in the wavelength and the polarization of the input optical signal.

In practice, the second stage is a Mach-Zehnder interferometer structure, each branch of which includes or consists of a semiconductor optical amplifier. The behavior of the structure can therefore be optimized by adjusting the bias currents of the amplifiers to obtain a maximum extinction rate at the output.

Accordingly, when the interferometer structure is designed to operate in phase opposition, the low levels of the output signal correspond to the high levels of the modulating signal and therefore to the low levels of the input signal. Because the probe wave is of constant power, equalizing the high levels of the modulating signal equalizes the low levels of the output signal. These low levels are accompanied by a low level of noise produced by the amplifier into which the modulating signal is injected.

However, the above solution has limitations in terms of the extinction rate of the output signal and the power dynamic range, i.e. the acceptable fluctuations in the low and high levels of the input signal.

SUMMARY OF THE INVENTION

The aim of the invention is to remedy the drawbacks of the above device and to this end the invention consists in a device for formatting an optical input signal in the form of a first optical wave modulated between low and high power levels, the device including:

a first stage for supplying, as a function of the input signal, a modulating optical signal in the form of a second optical wave modulated between low and high power levels, the high levels being stabilized so that they are not very dependent on the fluctuations in the low and high levels of the input signal, and a second stage including an interferometer structure adapted to receive the modulating signal and to supply an output signal resulting from respectively destructive or constructive interference of first and second coherent waves when the power of the modulating signal is respectively equal to the high and low levels, the structure including first and second guide branches receiving via first coupling means respectively first and second parts of a third optical wave, the branches being respectively provided with first and second semiconductor optical amplifiers, the first amplifier receiving the modulating signal via second coupling means and the first and second amplifiers respectively supplying the first and second coherent waves, in which device the third optical wave is modulated between low and high power levels in phase opposition to the modulation of the modulating signal and the low and high levels of the third optical wave are stabilized so that they are not very dependent on fluctuations in the low and high levels of the input signal.

The extinction rate is improved by modulating the power of the third signal (i.e. the probe signal) in phase opposition to the modulating signal. What is more, equalizing the low levels of the third signal and the high levels of the modulating signal stabilizes the destructive interference so that the low levels of the output signal can be kept at a low value.

There is a problem concerning the transient "chirp" phenomenon, i.e. the optical frequency modulation accompanying the variation in the power of the output wave of the interferometer structure.

To characterize this modulation a transient "chirp" parameter a is used, and is defined by the equation:

$$\alpha = 2P \cdot (d\phi/dt)/(dP/dt)$$

where P is the power of the modulated wave and φ is its phase expressed in radians.

A phase opposition interferometer structure modulator has a relatively high positive value of the parameter a. The parameter a should preferably have a null or even negative value for transmission via positive dispersion coefficient fibers, however. This is the case with "standard" fibers for a carrier wavelength around 1.55 μm, for example. The proposed solution has the advantage of reducing the absolute value of the parameter α.

Another aspect to be considered is that of equalizing the high levels of the output signal. If the first stage does not equalize the low levels of the modulating signal (as is the case using a simple wavelength converter employing a semiconductor optical amplifier), the fluctuations in the low levels can lead to fluctuations in the high levels of the output signals.

However, these fluctuations are attenuated if the interferometer structure is subject to conditions such that the index of the branch that receives the modulating signal is not very dependent on the fluctuations in the low levels of the signal. This index is that of the semiconductor optical amplifier of the branch and, as the index of the amplifier is directly related to its gain, this amounts to saying that the gain must not be highly dependent on these fluctuations.

To satisfy this condition a sufficiently low power could be imposed on the high level of the probe wave to maintain the amplifier in its linear region, independently of possible fluctuations in the low levels of the modulating signal. However, this solution is not favorable from the point of view of the extinction rate of the output signal.

Another possibility for avoiding this drawback is for the power of the high levels of the probe wave to be made sufficiently high to render the fluctuations in the low levels of the modulating signal negligible in comparison with the total optical power injected into the amplifier.

Also, in accordance with a supplementary feature of the invention, the high levels of the third optical wave are adjusted to keep the gain of the amplifiers of the interferometer structure saturated.

Other features and advantages of the invention will become apparent in the following description given with reference to the drawings.

BRIEF DESCRIPTION OF THE DRAWINGS

FIG. 1 is a schematic showing a preferred embodiment of the device in accordance with the invention.

FIGS. 2 and 3 are graphs used to explain the operating principle of the device from FIG. 1.

DETAILED DESCRIPTION OF THE PREFERRED EMBODIMENT

The device shown in FIG. 1 includes a first stage 1 receiving an optical input signal E which is to be formatted by the device. The signal E is a binary signal taking the form of a first optical wave modulated between low and high power levels. The first stage 1 supplies a modulating signal X and a probe signal M to a second stage 2. The signals X and M are respectively second and third optical carrier waves modulated between low and high power levels.

The first stage 1 includes a first wavelength converter 3 receiving the input signal E and supplying an output signal from which the modulating signal X is extracted. The converter 3 includes a semiconductor optical amplifier OA, a first phase of which is coupled to a laser oscillator 5 supplying the second carrier wave L. The other phase of the amplifier OA is connected to a circulator C having first and second ports respectively receiving the input signal E and injecting it into the amplifier OA. A third port of the circulator C supplies via a 1-to-2 coupler K the modulating signal X and a signal X' directed to the input of a second wavelength converter 4 of the first stage.

The second converter 4 includes a semiconductor optical amplifier OA', a first phase of which is coupled to a second laser oscillator 6 supplying the third carrier wave L'. The other phase of the amplifier of the OA' is connected to a circulator C' having first and second ports respectively receiving the wave X' and injecting it into the amplifier OA'. A third port of the circulator C' supplies the probe wave M.

The amplifiers OA and OA' receive the respective pump currents I and I'.

The behavior of the first converter 3 can be explained with the aid of FIG. 2, which is a diagram showing the variations in the gain G of the amplifier OA as a function of the total optical power P that it receives. The power P is the sum of the power PI of the carrier wave L and the power Pe of the input signal E. Modulating the power of the input signal E between the low level E0 and the high level E1 modulates the gain G between high values G(X1) and low levels G(X0). An appropriate choice of the power PI of the wave L supplied by the oscillator 5 prevents the fluctuations in the low levels E0 of the signal E causing the amplifier to operate outside its linear operating mode. The high value of the gain G(X1) therefore remains practically constant, independently of the fluctuations in the low levels E0.

The modulation of the gain G is applied to the carrier wave L and as a result the amplifier OA sends to the circulator C a power modulated wave in phase opposition to E. The modulating signal X has the same characteristics, with high levels X1 that are practically constant and low levels X0 that reproduce the fluctuations in the high levels E1 of the input signal E. Likewise the signal X'.

The behavior of the second converter 4 can be explained in the same way, except its input signal X' has high levels equalized by the first converter 3. As a result the probe signal M supplied by the converter 4 has equalized high and low levels.

Also, the signal M is phase modulated relative to E. The second stage 2 of the device from FIG. 1 includes a Mach-Zehnder interferometer structure made up of two guide branches including or consisting of respective semiconductor optical amplifiers OAa, OAb into which the respective pump currents 1a and 1b are injected.

A first Y-coupler K1 couples one end of each branch to the output of the second converter 4. A second Y-coupler K2 feeds the modulating signal X into the first amplifier OAa. A third Y-coupler K3 connected to the coupler K2 and to the second amplifier OAb supplies the output signal S.

The waves Ma and Mb from the coupler K1 are therefore extracted from the probe wave M and have the same power and the same optical phase. They are then amplified by the amplifiers OAa and OAb, respectively, to provide the amplified waves AMa and AMb which are coupled to form the signal S.

The currents 1a and 1b are adjusted so that the output signal S is the result of destructive interference between the waves AMa and AMb for the high power levels of the modulating signal X. The high levels of the modulating signal X and of the probe wave M can be fixed at particular values by adjusting the pump currents 1 and 1' of the respective amplifiers OA and OA' of the converters 3 and 4.

The behavior of the second stage 2 will now be explained with reference to the curves in FIG. 3. The figure shows in full line two curves representing the variations in the power Ps (expressed in dBm) of the output wave S as a function of the power Px (expressed in dBm) of the modulating signal X for two different values M0 and M1 of the power of the probe wave M, which for the moment is assumed to be unmodulated. The curves represented correspond to power levels M0 and M1 of the probe wave which are sufficiently high for the gain of the amplifiers AMa and AMb to be saturated. M0 is less than M1.

For the power levels M0 the power Ps retains a constant value S'1 for low values of the power Px. From a certain value of Px, Ps decreases if Px increases to reach a minimum S0 for a corresponding value X1 of Px. Beyond the value X1 the power Ps increases again.

For the higher power level M1 of the probe wave an analogous curve is obtained that is shifted to the right and upward so that the maximum value S1 of the power Ps obtained for low values of Px is higher than the corresponding maximum value S'1 of the first curve. In practice the minimum power S'0 is similar to the minimum power S0 of the first curve but is obtained for a value X'1 of the power of the modulating signal X greater than X1.

If the probe wave M is maintained at a constant power, the extinction rate of the output signal can hardly be improved by modifying the power of a continuous output wave without increasing the power of the signal X required to perform the modulation. On the other hand, if, in accordance with the invention, the power of the probe wave is modulated in phase opposition to the modulation between the levels X0 and X1 of the modulating signal X, the output power Ps is modulated between the high level S1 of the second curve and the low level S0 of the first curve (see the plot in dashed line). The extinction rate and the power dynamic range are therefore improved relative to the prior art embodiment.

This result can be further improved if the amplifiers OA and OA' of the wavelength converters 3 and 4 are stabilized gain semiconductor optical amplifiers.

What is more, compared to the conventional solution with no modulation of the probe, the upper branch of the interferometer structure receives a total optical power having a reduced depth of modulation, which contributes to reducing the "chirp" parameter α of the output signal S. Also, the lower branch receives a modulated optical power that confers a negative "chirp" parameter on the wave AMb, which also contributes to reducing the "chirp" parameter α of the signal S.

The invention is not limited to the embodiments that have just been described but also covers many equivalent variants. For example, the modulating signal X could be injected into the amplifier OAa with the same propagation direction as the wave Ma. Similarly, the Mach-Zehnder interferometer structure could be replaced by a Michelson structure. Equally, in the context of an integrated implementation, the circulators C and C' could be replaced by simple couplers.

What is claimed is:

1. A device for formatting an optical input signal in the form of a first optical wave modulated between low and high power levels, said device including:
    a first stage for supplying, as a function of said input signal, a modulating optical signal in the form of a second optical wave modulated between low and high power levels, said high levels being stabilized so that they are not very dependent on the fluctuations in said low and high levels of said input signal, and
    a second stage including an interferometer structure adapted to receive said modulating signal and to supply an output signal resulting from respectively destructive or constructive interference of first and second coherent waves when the power of said modulating signal is respectively equal to said high and low levels, said structure including first and second guide branches receiving via first coupling means respectively first and second parts of a third optical wave, said branches being respectively provided with first and second semiconductor optical amplifiers, said first amplifier receiving said modulating signal via second coupling means and said first and second amplifiers respectively supplying said first and second coherent waves, in which device said third optical wave is modulated between low and high power levels in phase opposition to the modulation of said modulating signal and said low and high levels of said third optical wave are stabilized so that they are not very dependent on fluctuations in said low and high levels of said input signal.

2. The device as claimed in claim 1 wherein said high levels of said third optical wave are adjusted to maintain the gain of said first and second amplifiers saturated.

3. The device claimed in claim 1 wherein said first stage includes a first wavelength converter provided with a third semiconductor amplifier adapted to receive said input signal and said second optical wave, said third amplifier and/or said input signal are adapted to saturate the gain of said third optical amplifier when said input signal is in the high state and said modulating signal is a first part of said second optical wave amplified by said third amplifier.

4. The device claimed in claim 3 wherein said first stage includes a second wavelength converter provided with a fourth semiconductor amplifier adapted to receive a second part of said second optical wave amplified by said third amplifier and a fourth optical wave, said fourth amplifier and/or said second wave part are adapted to saturate the gain of said fourth amplifier when said second wave part is in the high state and said third optical wave consists of said fourth optical wave amplified by said fourth amplifier.

5. The device claimed in claim 1 wherein said first and second coupling means are such that said first amplifier supplies said first auxiliary wave and receives said modulating signal in opposite propagation directions.

6. The device claimed in claim 5 wherein said third and/or fourth amplifiers are stabilized gain semiconductor optical amplifiers.

* * * * *